(12) United States Patent
Neubelt et al.

(10) Patent No.: US 6,842,586 B2
(45) Date of Patent: Jan. 11, 2005

(54) OTDR ARRANGEMENT FOR DETECTING FAULTS IN AN OPTICAL TRANSMISSION SYSTEM EMPLOYING TWO PAIRS OF UNIDIRECTIONAL OPTICAL FIBERS

(75) Inventors: Michael J. Neubelt, Little Silver, NJ (US); Stephen G. Evangelides, Jr., Red Bank, NJ (US); Jonathan A. Nagel, Brooklyn, NY (US)

(73) Assignee: Red Sky Systems, Inc., South Plainfield, NJ (US)

( * ) Notice: Subject to any disclaimer, the term of this patent is extended or adjusted under 35 U.S.C. 154(b) by 0 days.

(21) Appl. No.: 10/699,583

(22) Filed: Oct. 31, 2003

(65) Prior Publication Data

US 2004/0146305 A1 Jul. 29, 2004

Related U.S. Application Data

(60) Provisional application No. 60/442,187, filed on Jan. 23, 2003.

(51) Int. Cl.[7] .......................... H04B 10/08; H04B 10/00
(52) U.S. Cl. ............................ 398/21; 398/28; 398/31; 398/167
(58) Field of Search ............................. 398/13, 20, 21, 398/25, 28, 31–33, 35–37, 39, 105, 141, 167, 173, 177

(56) References Cited

U.S. PATENT DOCUMENTS

| | | | | | |
|---|---|---|---|---|---|
| 5,737,105 A | * | 4/1998 | Ohta et al. | ...................... | 398/18 |
| 6,028,684 A | * | 2/2000 | Kidorf | ........................... | 398/20 |
| 6,075,628 A | * | 6/2000 | Fisher et al. | .................. | 398/21 |

FOREIGN PATENT DOCUMENTS

WO    WO 99/12287    * 11/1999    ........... H04B/10/08

* cited by examiner

Primary Examiner—Dalzid Singh
(74) Attorney, Agent, or Firm—Mayer Fortkort & Williams, PC; Stuart H. Mayer, Esq.

(57) ABSTRACT

A method and apparatus is provided for using optical time-domain reflectometry (OTDR) with a WDM transmission system that includes a plurality of terminals interconnected by at least two pairs of unidirectional optical transmission paths each of which has at least one repeater therein. The method begins by transmitting an optical probe signal from a first OTDR unit associated with a first terminal into the repeater over a first optical path in a first of the at least two pairs of unidirectional optical transmission paths. The first OTDR unit receives a first returned OTDR signal over a second optical path in the first optical path pair. The first OTDR signal contains status information concerning the first optical path in the first optical path pair. The optical probe signal from the first optical path in the first optical path pair is coupled to a second optical path in the second optical path pair. The first optical path in the first optical path pair supports optical signals traveling in a direction opposite to optical signals supported by the second optical path in the second optical path pair. A second returned OTDR signal is received over a first optical path in the second optical path pair in which status information concerning the second optical path in the second optical path pair is embodied. The second returned OTDR signal traverses a repeater located in the second optical path pair. The second returned OTDR signal is coupled from the first optical path in the second optical path pair to the second optical path in the first optical path pair so that the second OTDR signal is returned to the first OTDR unit. The first optical path in the second optical path pair supports optical signals traveling in a direction opposite to optical signals supported by the second optical path in the first optical path pair.

9 Claims, 3 Drawing Sheets

OTDR ARRANGEMENT FOR DETECTING FAULTS IN AN OPTICAL TRANSMISSION SYSTEM EMPLOYING TWO PAIRS OF UNIDIRECTIONAL OPTICAL FIBERS

STATEMENT OF RELATED APPLICATION

This application claims the benefit of priority to U.S. Provisional Patent Application 60/442,187, filed Jan. 23, 2003, entitled "OTDR Arrangement For Detecting Faults In An Transmission System Employing Two Pairs Of Unidirectional Optical Fibers", which is incorporated by reference in its entirety herein.

FIELD OF THE INVNETION

The present invention relates generally to optical transmission systems, and more particularly to an optical time domain reflectometry (OTDR) arrangement that is used to detect faults in the optical transmission path of an optical transmission system.

BACKGROUND OF THE INVENTION

A typical long-range optical transmission system includes a pair of unidirectional optical fibers that support optical signals traveling in opposite directions. An optical signal is attenuated over long distances. Therefore, the optical fibers typically include multiple repeaters that are spaced apart from one another. The repeaters include optical amplifiers that amplify the incoming, attenuated optical signals. The repeaters also include an optical isolator that limits the propagation of the optical signal to a single direction.

In long-range optical transmission systems it is important to monitor the health of the system. For example, monitoring can be used to detect faults or breaks in the fiber optic cable such as attenuation in the optical fiber and splice loss, faulty repeaters or amplifiers or other problems with the system. Optical time domain reflectometry (OTDR) is one technique used to remotely detect faults in optical transmission systems. In OTDR, an optical pulse is launched into an optical fiber and backscattered signals returning to the launch end are monitored. In the event that there are discontinuities such as faults or splices in the fiber, the amount of backscattering generally changes and such change is detected in the monitored signals. Since backscatterring and reflection also occurs from elements such as couplers, the monitored OTDR signals are usually compared with a reference record, new peaks and other changes in the monitored signal level being indicative of changes in the fiber path, normally indicating a fault. The time between pulse launch and receipt of a backscattered signal is proportional to the distance along the fiber to the source of the backscattering, thus allowing the fault to be located. In a WDM system, one wavelength is usually assigned as the OTDR channel.

FIG. 1 shows a simplified block diagram of a wavelength division multiplexed (WDM) transmission system that employs a conventional OTDR. Each terminal 110 and 120 includes an OTDR unit 105 and 107, respectively. The transmission path consists of unidirectional optical fibers 106 and 108 that support optical signals traveling in opposite directions. In operation, OTDR unit 105 generates an optical pulse that is launched into optical fiber 106. The optical pulse serves as the OTDR probe signal. Because optical isolators 115 located downstream from each optical amplifier 106 prevent the OTDR probe signal from being reflected and backscattered to the OTDR 105 on fiber 106, each repeater 114 includes a coupler arrangement providing an optical path for use by the OTDR. In particular, signals generated by reflection and scattering of the probe signal on fiber 106 between adjacent repeaters enter coupler 118 and are coupled onto the opposite-going fiber 108 via coupler 122. The OTDR signal then travels along with the data on optical fiber 108. OTDR 107 operates in a similar manner to generate OTRD signals that are reflected and scattered on fiber 108 so that they are returned to OTDR 107 along optical fiber 106.

Clearly, in the OTDR arrangement shown in FIG. 1, an OTDR unit is required for each of the two unidirectional optical paths. As additional unidirectional optical paths are added between the terminals of a WDM transmission system, yet even more OTDR units will be required.

SUMMARY OF THE INVENTION

In accordance with the present invention, a method and apparatus is provided for using optical time-domain reflectometry (OTDR) with a WDM transmission system that includes a plurality of terminals interconnected by at least two pairs of unidirectional optical transmission paths each of which has at least one repeater therein. The method begins by transmitting an optical probe signal from a first OTDR unit associated with a first terminal into the repeater over a first optical path in a first of the at least two pairs of unidirectional optical transmission paths. The first OTDR unit receives a first returned OTDR signal over a second optical path in the first optical path pair. The first OTDR signal contains status information concerning the first optical path in the first optical path pair. The optical probe signal from the first optical path in the first optical path pair is coupled to a second optical path in the second optical path pair. The first optical path in the first optical path pair supports optical signals traveling in a direction opposite to optical signals supported by the second optical path in the second optical path pair. A second returned OTDR signal is received over a first optical path in the second optical path pair in which status information concerning the second optical path in the second optical path pair is embodied. The second returned OTDR signal traverses a repeater located in the second optical path pair. The second returned OTDR signal is coupled from the first optical path in the second optical path pair to the second optical path in the first optical path pair so that the second OTDR signal is returned to the first OTDR unit. The first optical path in the second optical path pair supports optical signals traveling in a direction opposite to optical signals supported by the second optical path in the first optical path pair.

In accordance with one aspect of the invention, a second optical probe signal is transmitted from a second OTDR unit associated with the first terminal into the repeater over the first optical path in the second optical path pair. The second OTDR unit receives a third returned OTDR signal over the second optical path in the second optical path pair. The third OTDR signal contains status information concerning the first optical path in the second optical path pair. The second optical probe signal is coupled from the first optical path in the second optical path pair to the second optical path in the first optical path pair. A fourth returned OTDR signal is received over the first optical path in the first optical path pair in which status information concerning the second optical path in the first optical path pair is embodied. The fourth returned OTDR signal is coupled from the first optical path in the first optical path pair to the second optical path in the second optical path pair so that the fourth OTDR signal is returned to the second OTDR unit.

In accordance with another aspect of the invention, the repeater includes a rare-earth doped optical amplifier through which the optical probe signal is transmitted.

In accordance with another aspect of the invention, the first returned OTDR signal is received at an output of the rare-earth doped optical amplifier.

DETAILED DESCRIPTION OF THE INVENTION

Figure 1:
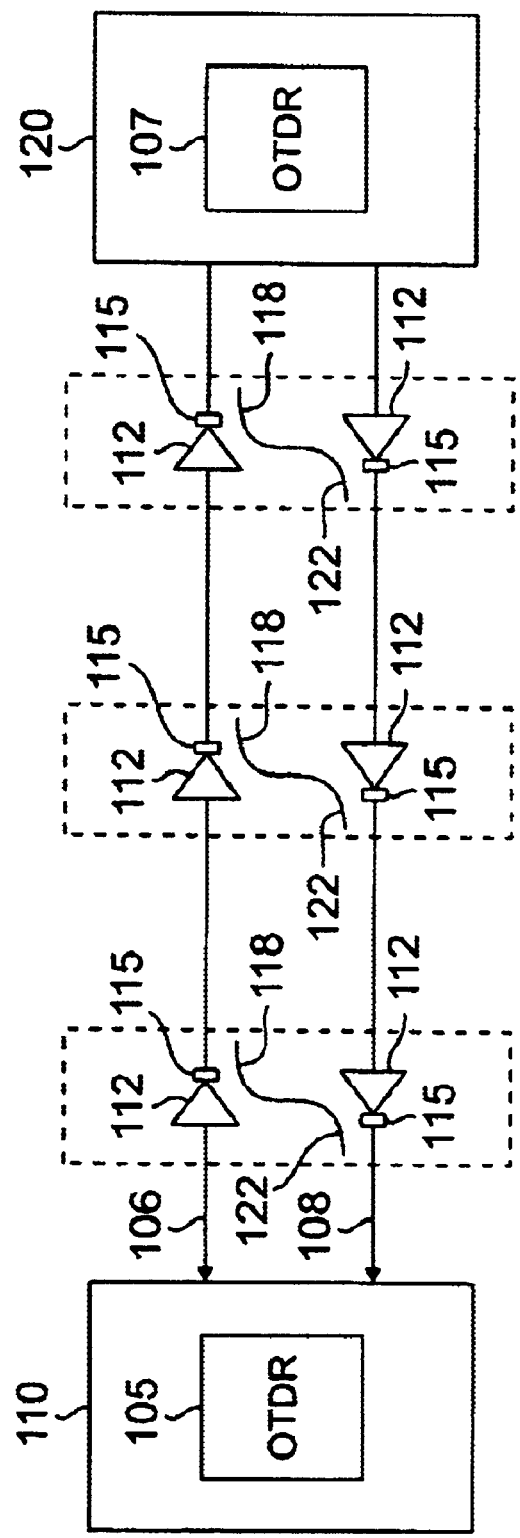
FIG. 1 shows a simplified block diagram of a wavelength division multiplexed (WDM) transmission system that employs a conventional OTDR.

An OTDR arrangement is provided for a wavelength division multiplexed (WDM) transmission system that employs two pairs of unidirectional optical fibers. If the OTDR arrangement shown in FIG. 1 were to be employed, four OTDR units would be required, one for each unidirectional optical path. In contrast, the present inventors have recognized that OTDR monitoring of all four optical fibers can be achieved with only two OTDR units, both of which may be located in the same terminal.

Figure 2:
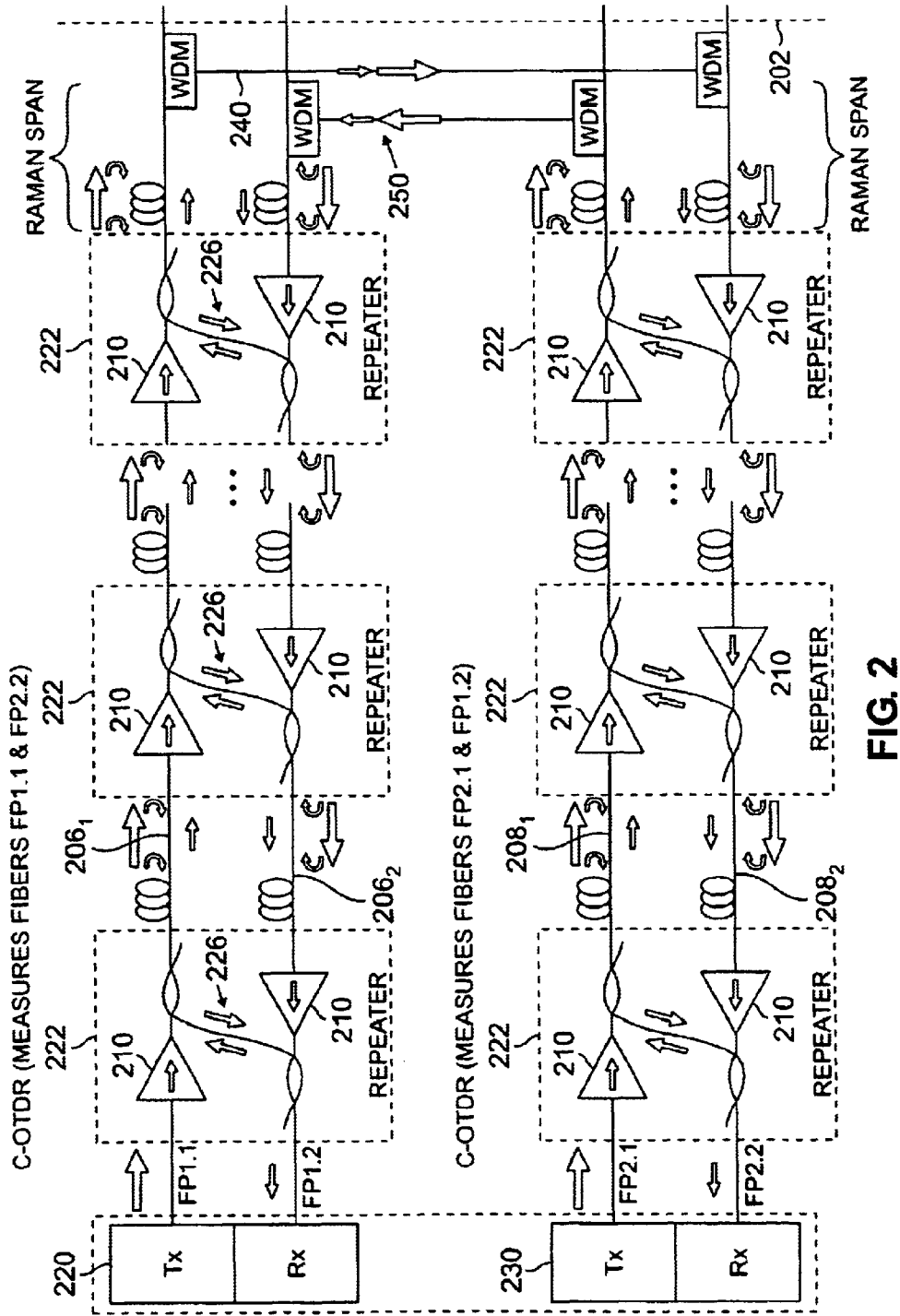
FIG. 2 shows a simplified block diagram of an exemplary WDM transmission system in accordance with the present invention.

FIG. 2 shows a simplified block diagram of an exemplary WDM transmission system in accordance with the present invention. In one embodiment of the invention the WDM transmission system is an undersea transmission system in which terminals 200 and 202 are located on shore and repeaters 222 are located undersea. The transmission system serves to transmit a plurality of optical channels over two pairs of unidirectional optical fibers 206 and 208 between terminals 200 and 202, which are remotely located with respect to one another. Optical fiber pair 206 consists of individual optical fibers $206_1$ and $206_2$, which support traffic traveling in opposite directions. Likewise, optical fiber pair 208 consists of individual optical fibers $208_1$ and $208_2$, which support traffic traveling in opposite directions. Terminals 200 and 202 each include transmitting and receiving unit (not shown). The transmitting unit generally includes a series of encoders and digital transmitters connected to a wavelength division multiplexer. For each WDM channel, an encoder is connected to an optical source, which, in turn, is connected to the wavelength division multiplexer. Likewise, the receiving unit includes a series of decoders, digital receivers and a wavelength division demultiplexer.

Optical amplifiers 210 are located along each fiber of fiber pairs 206 and 208 to amplify the optical signals as they travel along the transmission path. The optical amplifiers may be rare-earth doped optical amplifiers such as erbium doped fiber amplifiers that use erbium as the gain medium. As indicated in FIG. 2, a pair of rare-earth doped optical amplifiers 210 supporting opposite-traveling signals along one of the fiber pairs 206 and 208 is often housed in a single unit known as a repeater 222. While only six repeaters 222 are depicted in FIG. 2 for clarity of discussion, it should be understood by those skilled in the art that the present invention finds application in transmission paths of all lengths having many additional (or fewer) sets of such repeaters. Optical isolators (not shown in FIG. 2) are located downstream from the optical amplifiers 210 to eliminate backwards propagating light and to eliminate multiple path interference.

Because the optical isolators located downstream from each optical amplifier 210 prevent the OTDR probe signal from being reflected and backscattered to the OTDR unit on the fiber on which it is transmitted, each repeater 222 includes a loopback path 226 providing an optical path for use by the OTDR. The loopback paths 226 serve to couple the signals generated by reflection and scattering of the OTDR probe signal on outgoing fiber to the opposite-going fiber in the same fiber pair. That is, the loopback paths 226 located between fibers $206_1$ and $206_2$ in fiber pair 206 couple the reflected and backscattered OTDR signal from fiber $206_1$ to fiber $206_2$ so that it can be returned to OTDR unit 220 for analysis. Likewise, the loopback paths 226 located between fibers $208_1$ and $208_2$ in fiber pair 208 couple the reflected and backscattered OTDR signal from fiber $208_1$ to fiber $208_2$ in fiber pair 208 so that it can be returned to OTDR unit 230 for analysis.

The present inventors have recognized that only two OTDR units are required to monitor the four optical fibers employed in the transmission system of FIG. 2. As shown, this is accomplished by providing, in addition to loopback paths 226, trans fiber pair paths 240 and 250. Trans fiber pair 240 provides an optical path from fiber $206_1$ in fiber pair 206 to fiber $208_2$ in fiber pair 208. Likewise, trans fiber pair 250 provides an optical path from fiber $208_1$ in fiber pair 208 to fiber $206_2$ in fiber pair 206.

In operation, an OTDR probe signal is generated by OTDR unit 220 and transmitted along fiber $206_1$. Backscattered and reflected OTDR signals are returned to OTDR unit 220 along fiber $206_2$ via loopback paths 226. After traversing the final repeater 222 located along fiber pair 206 the OTDR probe signal traverses trans fiber pair path 240 and continues along fiber $208_2$ in fiber pair 208. As the OTDR probe signal continues along fiber $208_2$, the backscattered and reflected OTDR signals traverse loopback paths 226 so that they travel in the opposite-going direction along fiber $208_1$. The backscattered and reflected OTDR signals then traverse trans fiber pair path 250 so that they can be returned to OTDR unit 220 along fiber $206_2$ of fiber pair 206. Accordingly, an OTDR probe signal generated by OTDR unit 220 can be used to monitor the status of fiber $206_1$ in fiber pair 206 and fiber $208_2$ in fiber pair 208.

Similarly, an OTDR probe signal generated by OTDR unit 230 is transmitted along fiber $208_1$. Backscattered and reflected OTDR signals are returned to OTDR unit 230 along fiber $208_2$ via loopback paths 226. After traversing the final repeater 222 located along fiber pair 208 the OTDR probe signal traverses trans fiber pair path 250 and continues along fiber $206_2$ in fiber pair 206. As the OTDR probe signal continues along fiber $206_2$, the backscattered and reflected OTDR signals traverse loopback paths 226 so that they travel in the opposite-going direction along fiber $206_1$. The backscattered and reflected OTDR signals then traverse trans fiber pair path 240 so that they can be returned to OTDR unit 230 along fiber $208_2$ of fiber pair 208. Accordingly, an OTDR probe signal generated by OTDR unit 230 can be used to monitor the status of fiber $208_1$ in fiber pair 208 and fiber $206_2$ in fiber pair 206.

Figure 3:
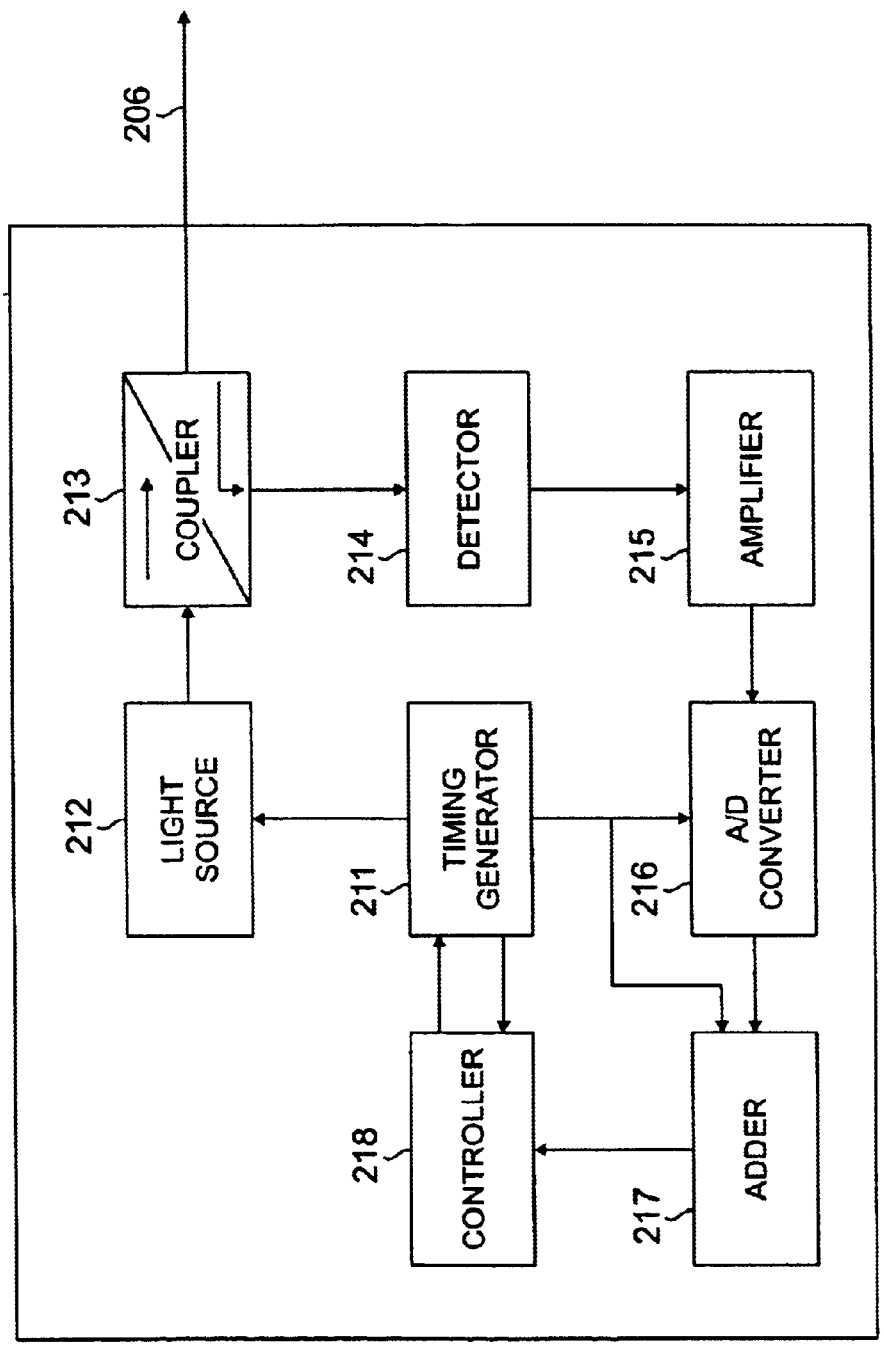
FIG. 3 is a block diagram showing one example of a conventional OTDR unit.

FIG. 3 is a block diagram showing one example of a conventional OTDR unit that may serve as OTDR units 220 and 230. The OTDR unit includes a timing generator 211, a light source 212, an optical coupler 213, a detector 214, an amplifier 215, an A/D converter 216, an adder 217 and controller 218. An optical pulse emitted by light source 212, which is driven by a signal from the timing generator 211, is launched into the transmission fiber 206 through the optical coupler 213. The reflected and backscattered OTDR signal is received by the detector 214 through the optical coupler 213, amplified with a predetermined amplification factor by the amplifier 215 and introduced to the A/D converter 216. The A/D converter 216 samples the output of the amplifier 215 in a predetermined sampling cycle, and each of the sampled data is supplied to the adder 217. The adder 217 adds together the sampled data for a predetermined time and averages the data that is supplied to the controller 218. The controller 218 analyses the averaged data to monitor the transmission path for faults. Of course, those of ordinary skill in the art will recognize that the present invention encompasses many different OTDR units and that the particular configuration depicted in FIG. 3 is presented for illustrative purposes only.

What is claimed is:

1. A method of using optical time-domain reflectometry (OTDR) with a WDM transmission system that includes a plurality of terminals interconnected by at least two pairs of unidirectional optical transmission paths each of which has at least one repeater therein, said method comprising the steps of:

transmitting an optical probe signal from a first OTDR unit associated with a first terminal into the repeater over a first optical path in a first of the at least two pairs of unidirectional optical transmission paths;

receiving by the first OTDR unit a first returned OTDR signal over a second optical path in the first optical path pair, said first OTDR signal containing status information concerning the first optical path in the first optical path pair;

coupling the optical probe signal from the first optical path in the first optical path pair to a second optical path in the second optical path pair, said first optical path in the first optical path pair supporting optical signals traveling in a direction opposite to optical signals supported by the second optical path in the second optical path pair;

receiving over a first optical path in the second optical path pair a second returned OTDR signal in which status information concerning the second optical path in the second optical path pair is embodied, said second returned OTDR signal traversing a repeater located in the second optical path pair; and coupling the second returned OTDR signal from the first optical path in the second optical path pair to the second optical path in the first optical path pair so that the second OTDR signal is returned to the first OTDR unit, said first optical path in the second optical path pair supporting optical signals traveling in a direction opposite to optical signals supported by the second optical path in the first optical path pair.

2. The method of claim 1 further comprising the steps of:

transmitting a second optical probe signal from a second OTDR unit associated with the first terminal into the repeater over the first optical path in the second optical path pair;

receiving by the second OTDR unit a third returned OTDR signal over the second optical path in the second optical path pair, said third OTDR signal containing status information concerning the first optical path in the second optical path pair;

coupling the second optical probe signal from the first optical path in the second optical path pair to the second optical path in the first optical path pair;

receiving over the first optical path in the first optical path pair a fourth returned OTDR signal in which status information concerning the second optical path in the first optical path pair is embodied; and coupling the fourth returned OTDR signal from the first optical path in the first optical path pair to the second optical path in the second optical path pair so that the fourth OTDR signal is returned to the second OTDR unit.

3. The method of claim 1 wherein said at least one repeater includes a rare-earth doped optical amplifier through which the optical probe signal is transmitted.

4. The method of claim 3 wherein the step of receiving the first returned OTDR signal is performed at an output of the rare-earth doped optical amplifier.

5. The method of claim 1 wherein the status information includes discontinuities in the optical paths that give rise to optical attenuation.

6. In a bi-directional optical transmission system that includes first and second terminals interconnected by at least first and second unidirectional optical transmission path pairs, each of said first and second path pairs having at least one repeater therein, an OTDR arrangement comprising:

a first OTDR unit associated with the first terminal transmitting a first optical probe signal over a first optical path in the first optical path pair and receiving returned OTDR signals in which status information concerning the first optical path in the first optical path pair and a second optical path in the second optical path pair, said first optical path in the first optical path pair supporting optical signals traveling in a direction opposite to optical signals supported by the second optical path in the second optical path pair;

a second OTDR unit associated with the first terminal transmitting a second optical probe signal over a first optical path in the second optical path pair and receiving returned OTDR signals in which status information concerning the first optical path in the second optical path pair and a second optical path in the first optical path pair, said first optical path in the second optical path pair supporting optical signals traveling in a direction opposite to optical signals supported by the second optical path in the first optical path pair;

a third optical path optically coupling the first optical path in the first optical path pair to the second optical path in the second optical path pair for communicating therebetween the first optical probe signal and the returned OTDR signals in which status information concerning the first optical path in the second optical path pair; and a fourth optical path optically coupling the second optical path in the first optical path pair to the first optical path in the second optical path pair for communicating therebetween the second optical probe signal and the returned OTDR signals in which status information concerning the second optical path in the second optical path pair.

7. In the bi-directional optical transmission system of claim 6, an OTDR arrangement wherein said at least one repeater includes a rare-earth doped optical amplifier through which the optical probe signal is transmitted.

8. In the bidirectional optical transmission system of claim 7, an OTDR arrangement further comprising an optical loopback path optically coupling the first optical path to the second optical path in each optical path pair.

9. In the bidirectional optical transmission system of claim 6, an OTDR arrangement wherein the status information includes discontinuities in the optical paths that give rise to optical attenuation.

* * * * *

UNITED STATES PATENT AND TRADEMARK OFFICE
CERTIFICATE OF CORRECTION

PATENT NO. : 6,842,586 B2
DATED : January 11, 2005
INVENTOR(S) : Michael J. Neubelt et al.

It is certified that error appears in the above-identified patent and that said Letters Patent is hereby corrected as shown below:

Column 1,
Line 10, before "Transmission", insert -- Optical --.

Column 2,
Line 7, after "generate", change "OTRD" to -- OTDR --.

Column 3,
Line 42, change first word "unit" to -- units --.

Column 4,
Line 13, after "fiber", change "208," to -- $208_1$ --.

Column 5,
Line 7, after "controller 218", change "analyses" to -- analyzes --.

Signed and Sealed this

Nineteenth Day of April, 2005

JON W. DUDAS
*Director of the United States Patent and Trademark Office*